US012726109B2

(12) United States Patent
Su

(10) Patent No.: US 12,726,109 B2
(45) Date of Patent: Sep. 1, 2026

(54) CONVERTER CIRCUIT, POWER STAGE CIRCUIT AND TEMPERATURE BALANCING METHOD

(71) Applicant: PowerX Semiconductor Corporation, Hsinchu County (TW)

(72) Inventor: Chih-Chieh Su, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 285 days.

(21) Appl. No.: 18/494,782

(22) Filed: Oct. 26, 2023

(65) Prior Publication Data

US 2025/0062682 A1 Feb. 20, 2025

(30) Foreign Application Priority Data

Aug. 17, 2023 (TW) ................................ 112131033

(51) Int. Cl.
*H02M 1/32* (2007.01)
*H02M 1/00* (2007.01)
*H02M 3/158* (2006.01)

(52) U.S. Cl.
CPC ......... *H02M 1/327* (2021.05); *H02M 1/0009* (2021.05); *H02M 1/0025* (2021.05); *H02M 3/1584* (2013.01)

(58) Field of Classification Search
CPC .... H02M 1/327; H02M 1/084; H02M 3/1584; H02M 1/32; H02M 3/1586
See application file for complete search history.

(56) References Cited

U.S. PATENT DOCUMENTS

| | | | | |
|---|---|---|---|---|
| 9,285,813 | B2 | 3/2016 | Pietri et al. | |
| 2011/0025292 | A1* | 2/2011 | Huang | H02J 1/102 323/318 |
| 2014/0312857 | A1* | 10/2014 | Zheng | H02J 3/46 323/234 |
| 2015/0002126 | A1* | 1/2015 | Ouyang | H02M 3/1584 323/304 |
| 2018/0269786 | A1 | 9/2018 | Mirjafari et al. | |

(Continued)

FOREIGN PATENT DOCUMENTS

| | | |
|---|---|---|
| CN | 104467445 A | 3/2015 |
| CN | 109861532 A | 6/2019 |

(Continued)

*Primary Examiner* — Gustavo A Rosario-Benitez
(74) *Attorney, Agent, or Firm* — CKC & Partners Co., LLC

(57) ABSTRACT

The disclosure provides a converter circuit, a power stage circuit and a temperature balancing method. The converter circuit includes power stage circuits and a control circuit. The power stage circuit includes a power circuit, a temperature sense circuit, a current sense circuit and a current feedback control circuit. The temperature sense circuit senses a temperature of the power stage circuit, to output a temperature sense value. The current sense circuit senses an output current of the power circuit, to output a current sense value. The current feedback control circuit compares the temperature sense value with a highest temperature value of the power stage circuits, and outputs one of the current sense value and adjusted current sense value to the control circuit according to a comparison result of the temperature sense value and the highest temperature value.

9 Claims, 8 Drawing Sheets

(56) References Cited

U.S. PATENT DOCUMENTS

2022/0345126 A1* 10/2022 Harriman .............. H02M 3/158
2023/0238882 A1* 7/2023 Soleno ................ H02M 1/0025 323/282
2023/0336082 A1* 10/2023 Dai ......................... H02M 1/32

FOREIGN PATENT DOCUMENTS

| | | | |
|---|---|---|---|
| CN | 111786588 | A | 10/2020 |
| CN | 112117892 | A | 12/2020 |
| CN | 115133758 | A | 9/2022 |
| JP | 6068668 | B2 | 1/2017 |
| TW | 200849784 | A | 12/2008 |
| TW | I350048 | B | 10/2011 |
| TW | 202211609 | A | 3/2022 |
| TW | 202308274 | A | 2/2023 |
| TW | M643437 | U | 7/2023 |
| TW | M649022 | U | 12/2023 |

* cited by examiner

500

CONVERTER CIRCUIT, POWER STAGE CIRCUIT AND TEMPERATURE BALANCING METHOD

CROSS-REFERENCE TO RELATED APPLICATION

This application claims priority to Taiwan Application Serial Number 112131033, filed Aug. 17, 2023, which is herein incorporated by reference in its entirety.

BACKGROUND

Field of Invention

This disclosure relates to a power stage circuit and a temperature balancing method, in particular to the power stage circuit and the temperature balancing method which are applied to a converter circuit.

Description of Related Art

In the related art of the multi-phase buck converters, the controller adjusts the duty ratio of the pulse width modulation signal according to the current sense value reported by the smart power stage (SPS) circuit of each phase, so that the SPS circuit of each phase achieves current balancing. Moreover, the user can further adjust the current sense value received by the controller manually through the controller, so that the SPS circuit of each phase achieves temperature balancing. However, the above approaches are inconvenient for the user because the user is required to adjust manually.

SUMMARY

An aspect of present disclosure relates to a converter circuit. The converter circuit includes a plurality of power stage circuits and a control circuit. The plurality of power stage circuits are configured to output a plurality of output currents according to a plurality of control signals, and are configured to selectively adjust a plurality of current sense values corresponding to the plurality of output currents according to a comparison result of a plurality of temperature sense values of the plurality of power stage circuits and a highest temperature value of the plurality of power stage circuits. The control circuit is electrically coupled to the plurality of power stage circuits, is configured to output the plurality of control signals to the plurality of power stage circuits, is configured to receive the plurality of current sense values from the plurality of power stage circuits, and is configured to adjust the plurality of control signals according to the plurality of current sense values, so that the plurality of output currents are changed in magnitude.

Another aspect of present disclosure relates to a power stage circuit. The power stage circuit includes a power circuit, a temperature sense circuit, a current sense circuit, a temperature feedback terminal, a current feedback terminal and a current feedback control circuit. The power circuit is configured to output an output current according to a control signal. The temperature sense circuit is configured to sense a temperature of the power stage circuit, to output a temperature sense value. The current sense circuit is electrically coupled to the power circuit, and is configured to sense the output current, to output a current sense value. The temperature feedback terminal is configured to receive a highest temperature value. The current feedback control circuit is electrically coupled to the temperature sense circuit, the current sense circuit, the temperature feedback terminal and the current feedback terminal, is configured to compare the temperature sense value with the highest temperature value, and is configured to output one of the current sense value and the adjusted current sense value to the current feedback terminal according to a comparison result of the temperature sense value and the highest temperature value.

Yet another aspect of present disclosure relates to a temperature balancing method applicable to a converter circuit. The converter circuit includes a plurality of power stage circuits and a control circuit, the plurality of power stage circuits are configured to output a plurality of output currents according to a plurality of control signals output by the control circuit. The temperature balancing method includes: by the plurality of power stage circuits, comparing a plurality of temperature sense values of the plurality of power stage circuits with a highest temperature value of the plurality of power stage circuits; by the plurality of power stage circuits, selectively adjusting a plurality of current sense values corresponding to the plurality of output currents according to a comparison result of the plurality of temperature sense values and the highest temperature value; and by the control circuit, adjusting the plurality of control signals according to the plurality of current sense values, so that the plurality of output currents are changed in magnitude.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed.

Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
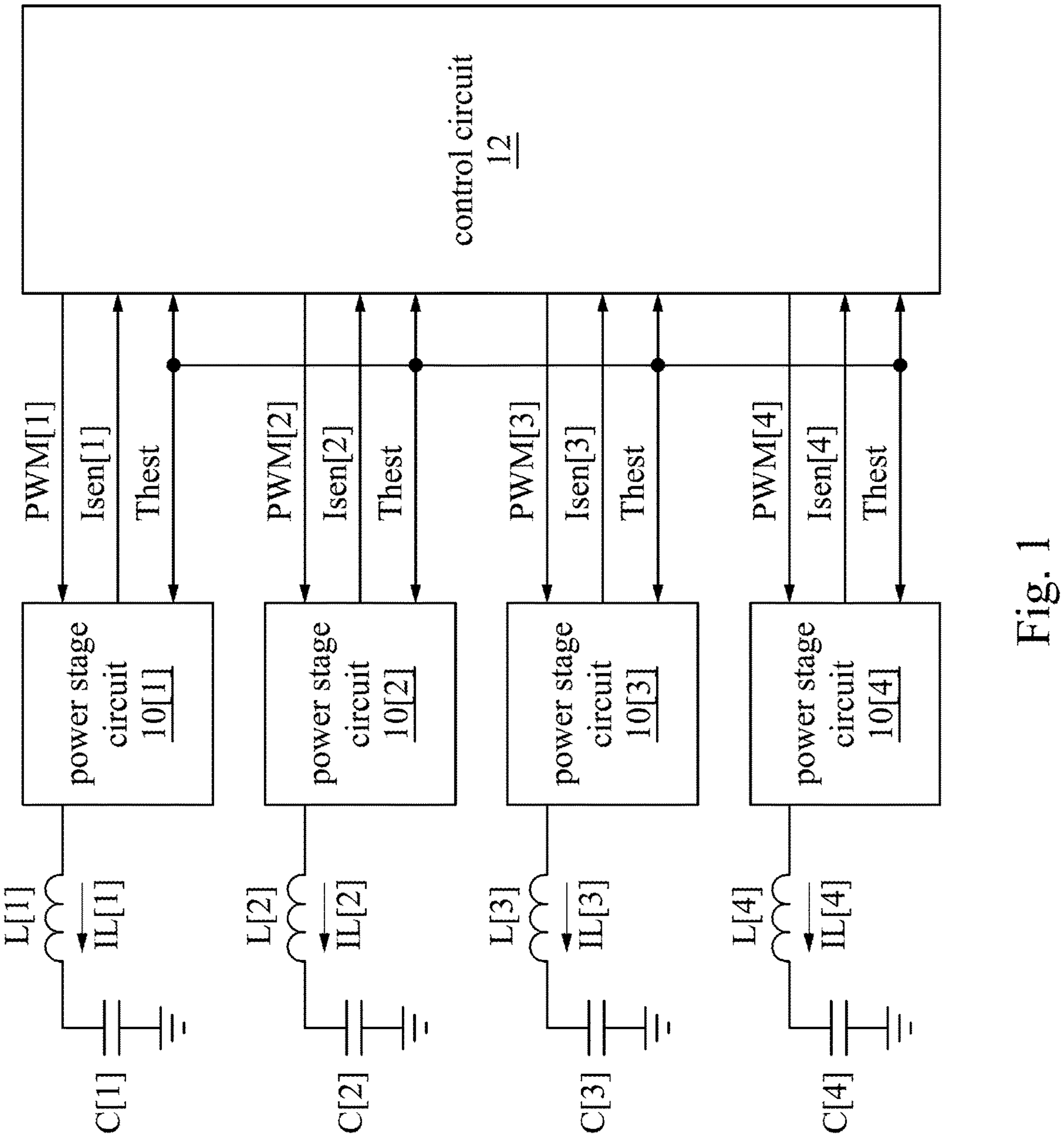
FIG. 1 is a block diagram of a converter circuit in accordance with some embodiments of the present disclosure.

Referring to FIG. 1, FIG. 1 is a block diagram of a converter circuit 100 in accordance with some embodiments of the present disclosure. For clarity and convenience of descriptions, in FIG. 1, number indexes [1]-[4] are used to refer to individual components or signals respectively, but it is not intended to limit the amount of the components or signals to a specific number. In some embodiments, as shown in FIG. 1, the converter circuit 100 includes a plurality of power stage circuits 10[1]-10[4] and a control circuit 12, in which the control circuit 12 is electrically coupled to the power stage circuits 10[1]-10[4]. In particular, the converter circuit 100 can be implemented by a multi-phase buck converter.

During the operation of the converter circuit 100, the control circuit 12 is configured to output a plurality of control signals PWM[1]-PWM[4] to the power stage circuits 10[1]-10[4] respectively. The power stage circuits 10[1]-10[4] are configured to output a plurality of output currents IL[1]-IL[4] according to the control signals PWM[1]-PWM[4] respectively.

In some embodiments, the output current IL of each power stage circuit 10 is output to a corresponding passive circuit. In particular, as shown in FIG. 1, the output current IL[1] of the power stage circuit 10[1] is output to an inductor L[1] and a capacitor C[1] connected in series between a current output terminal of the power stage circuit 10[1] and a ground terminal. The output current IL[2] of the power stage circuit 10[2] is output to an inductor L[2] and a capacitor C[2] connected in series between a current output terminal of the power stage circuit 10[2] and the ground terminal. The output current IL[3] of the power stage circuit 10[3] is output to an inductor L[3] and a capacitor C[3] connected in series between a current output terminal of the power stage circuit 10[3] and the ground terminal. The output current IL[4] of the power stage circuit 10[4] is output to an inductor L[4] and a capacitor C[4] connected in series between a current output terminal of the power stage circuit 10[4] and the ground terminal.

In some embodiments, multiple temperature feedback terminals (not shown in FIG. 1) of the power stage circuits 10[1]-10[4] are coupled to each other and are coupled to the control circuit 12, and therefore the control circuit 12 and the power stage circuits 10[1]-10[4] can receive a highest temperature value Thest of the power stage circuits 10[1]-10[4]. The method of generating the highest temperature value Thest is described in detail below.

In some embodiments, the power stage circuits 10[1]-10[4] are configured to output a plurality of current sense values Isen[1]-Isen[4] respectively corresponding to the output currents IL[1]-IL[4] to the control circuit 12, so that the control circuit 12 can perform a current balancing operation according to the output currents IL[1]-IL[4]. The current balancing operation performed by the control circuit 12 is described with reference to FIGS. 2A and 2B.

Figures 2A, 2B:
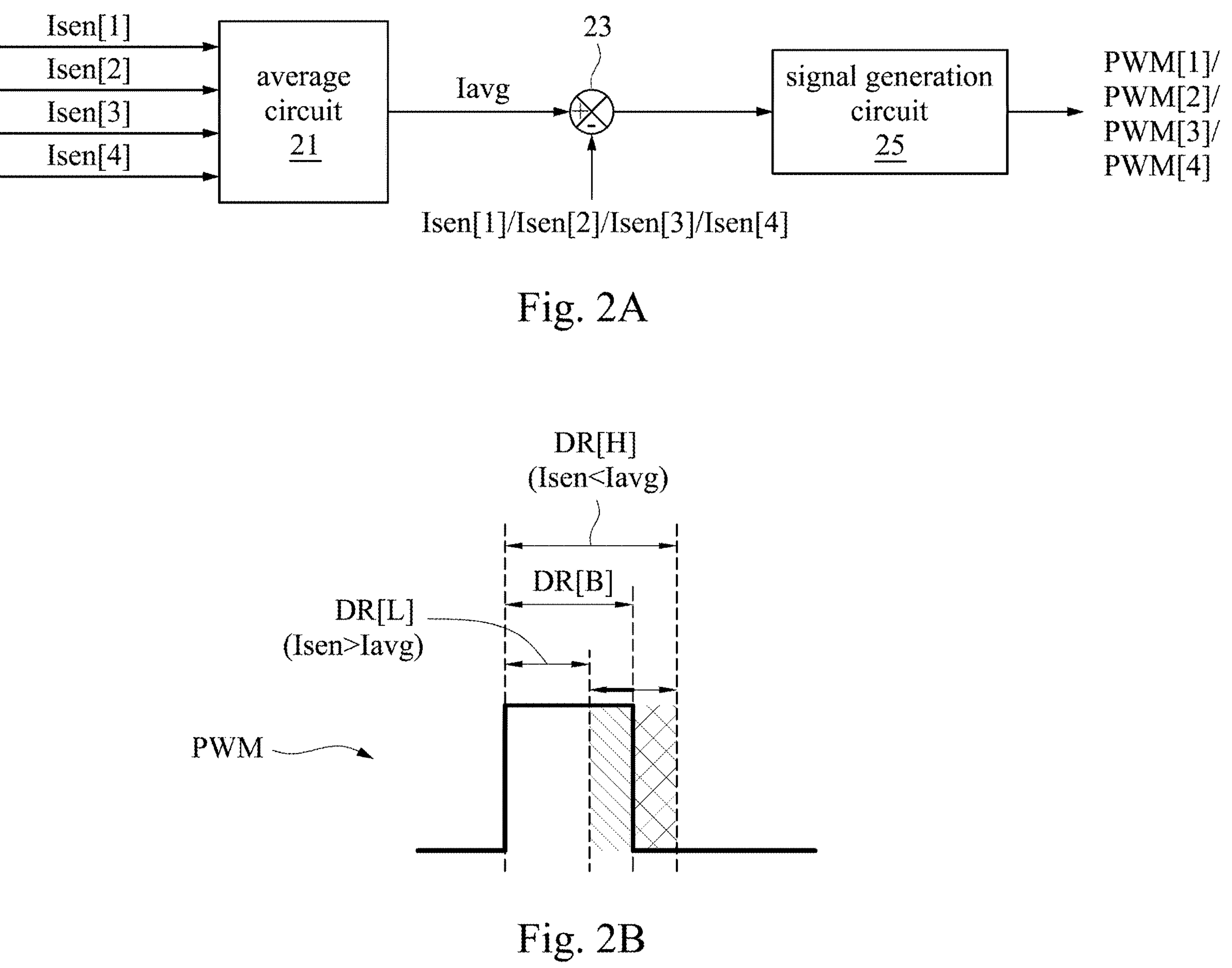
FIG. 2A is a schematic diagram of a current balancing operation performed by a control circuit of the converter circuit in accordance with some embodiments of the present disclosure.
FIG. 2B is a schematic diagram of a control signal in accordance with some embodiments of the present disclosure.

Referring to FIGS. 2A and 2B, FIG. 2A is a schematic diagram of the current balancing operation performed by the control circuit 12 in accordance with some embodiments of the present disclosure, and FIG. 2B is a schematic diagram of an adjustment of the control signal PWM in accordance with some embodiments of the present disclosure. In some embodiments, the control circuit 12 includes an average circuit 21, a comparison circuit 23 and a signal generation circuit 25, in which the comparison circuit 23 is electrically coupled between the average circuit 21 and the signal generation circuit 25. As shown in FIG. 2A, the average circuit 21 is configured to receive the current sense values Isen[1]-Isen[4], and is configured to average the current sense values Isen[1]-Isen[4] to generate a current average value Iavg. The comparison circuit 23 is configured to receive the current average value Iavg and the current sense values Isen[1]-Isen[4], and is configured to compare each of the current sense values Isen[1]-Isen[4] with the current average value Iavg to generate a plurality of comparison results to the signal generation circuit 25. Accordingly, the signal generation circuit 25 is configured to adjust the control signals PWM[1]-PWM[4] according to the comparison results generated by the comparison circuit 23. For example, the comparison result of the current sense value Isen[1] and the current average value Iavg is used to adjust the control signal PWM[1], the comparison result of the current sense value Isen[2] and the current average value Iavg is used to adjust the control signal PWM[2], and so on. Moreover, the control signals PWM[1]-PWM[4] are configured to control the output currents IL[1]-IL[4] output by the power stage circuits 10[1]-10[4] respectively.

In the following embodiments, if the reference symbol of a component or signal is used without specifying the index thereof, it means that the reference symbol can be referred to any component or signal in the component group or signal group. For example, the control signal PWM can be referred to anyone of the control signals PWM[1]-PWM[4]. In some embodiments, as shown in FIG. 2B, the control signal PWM is a pulse width modulation signal, and has a duty ratio DR[B] before being adjusted. In some embodiments, the comparison result generated by the comparison circuit 23 shows that the current sense value Isen is smaller than the current average value Iavg, so that the signal generation circuit 25 raises the duty ratio DR[B] of the corresponding control signal PWM to a higher duty ratio DR[H]. In some embodiments, the comparison result generated by the comparison circuit 23 shows that the current sense value Isen is greater than the current average value Iavg, so that the signal generation circuit 25 reduces the duty ratio DR[B] of the corresponding control signal PWM to a lower duty ratio DR[L].

In accordance with the embodiments of FIG. 2B, the higher the duty ratio DR of the control signal PWM, the greater the output current IL output by the power stage circuit 10 receiving the control signal PWM will be. In addition, the lower the duty ratio DR of the control signal PWM, the smaller the output current IL output by the power stage circuit 10 receiving the control signal PWM will be. In other words, when the current sense value Isen is smaller than the current average value Iavg, the control circuit 12 raises the duty ratio DR of the control signal PWM, to increase the output current IL of the power stage circuit 10.

When the current sense value Isen is greater than the current average value Iavg, the control circuit 12 reduces the duty ratio DR of the control signal PWM, to decrease the output current IL of the power stage circuit 10.

As can be seen from the above embodiments, the control circuit 12 is configured to adjust the control signals PWM [1]-PWM[4] according to the current sense values Isen[1]-Isen[4], so that the output currents IL[1]-IL[4] are changed in magnitude. After the output currents IL[1]-IL[4] are changed, the power stage circuits 10[1]-10[4] would update the current sense values Isen[1]-Isen[4] output therefrom. To summarize, based on this feedback control, the control circuit 12 would adjust the control signals PWM[1]-PWM [4] multiple times according to the current sense values Isen[1]-Isen[4] received from the power stage circuits 10[1]-10[4], so as to adjust the output currents IL[1]-IL[4] multiple times until the output currents IL[1]-IL[4] are substantially the same (i.e., current balancing is achieved).

Further descriptions would be made in accordance with the above embodiments. Under the condition that the power stage circuits 10[1]-10[4] has achieved the current balancing, the power stage circuits 10[1]-10[4] can also achieve temperature balancing (i.e., temperatures thereof are substantially the same) theoretically. However, the circuits may not be ideal in practice. Under the condition that the power stage circuits 10[1]-10[4] achieve the current balancing, the heat dissipation capabilities of the power stage circuits 10[1]-10[4] may each be affected by adjacent heat sources (e.g., a circuit), thus failing to achieve the temperature balancing.

Figure 3:
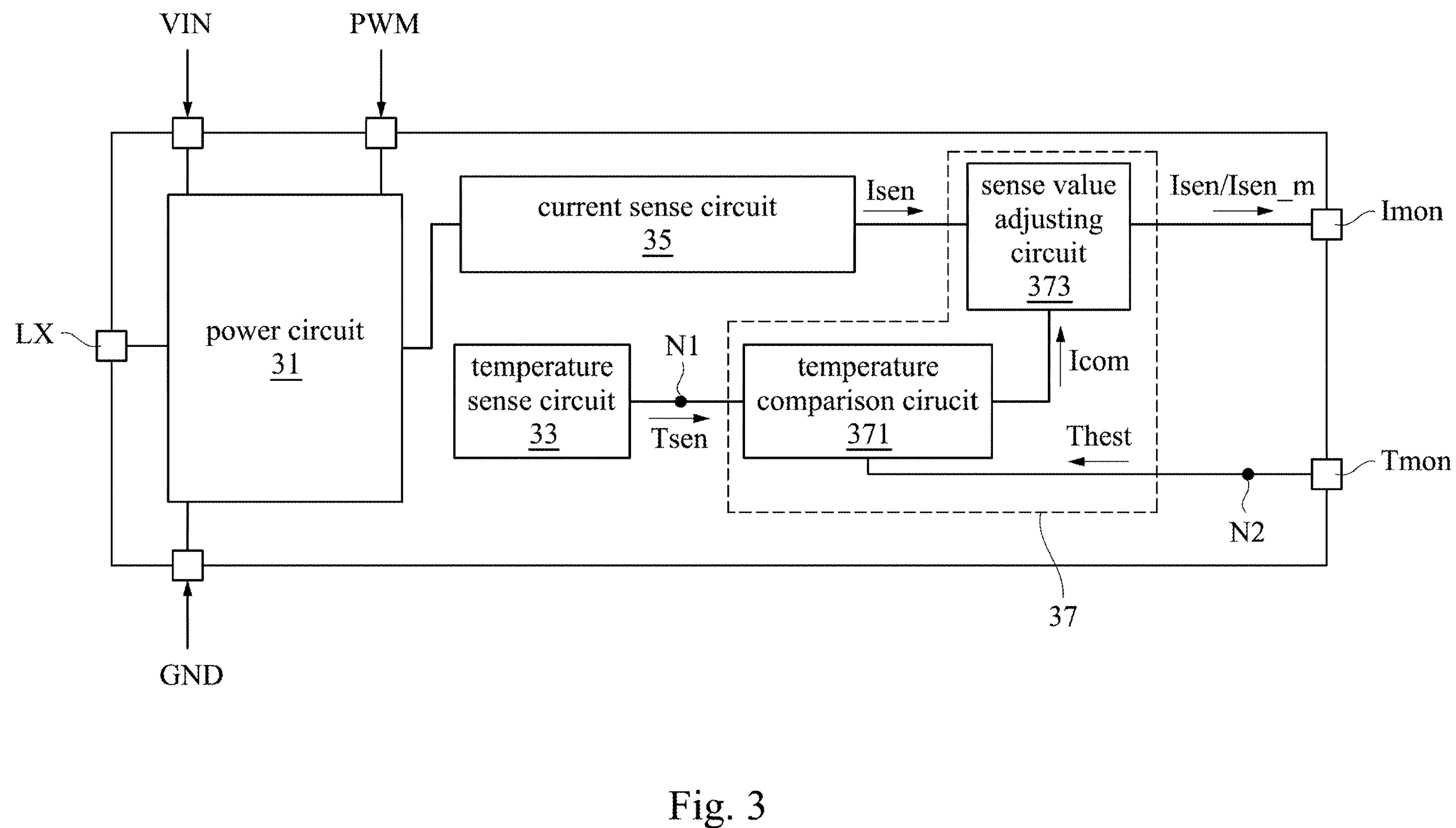
FIG. 3 is a block diagram of a power stage circuit in accordance with some embodiments of the present disclosure.

Referring to FIG. 3, FIG. 3 is a block diagram of the power stage circuit 10 in accordance with some embodiments of the present disclosure. In some embodiments, the power stage circuit 10 includes a power circuit 31, a temperature sense circuit 33, a current sense circuit 35 and a current feedback control circuit 37. In particular, the power circuit 31 is electrically coupled to the current output terminal LX of the power stage circuit 10. The current sense circuit 35 is electrically coupled to the power circuit 31. The current feedback control circuit 37 is electrically coupled to the temperature sense circuit 33, the current sense circuit 35, a temperature feedback terminal Tmon of the power stage circuit 10, and a current feedback terminal Imon of the power stage circuit 10.

In addition, as shown in FIG. 3, the current feedback control circuit 37 includes a temperature comparison circuit 371 and a sense value adjusting circuit 373. The temperature comparison circuit 371 is electrically coupled to the temperature sense circuit 33 and the temperature feedback terminal Tmon at a first node N1 and a second node N2 respectively. The sense value adjusting circuit 373 is electrically coupled to the current sense circuit 35, the temperature comparison circuit 371 and the current feedback terminal Imon.

In some embodiments, the power circuit 31 is configured to receive the control signal PWM, an input voltage VIN and a ground voltage GND, and is configured to output the output current IL from the current output terminal LX according to the control signal PWM. The temperature sense circuit 33 is configured to sense the temperature of the power stage circuit 10, and thereby output a temperature sense value Tsen. The current sense circuit 35 is configured to sense the output current IL, and thereby output the current sense value Isen corresponding to the output current IL. The temperature feedback terminal Tmon is configured to receive the highest temperature value Thest from an external element of the power stage circuit 10 (e.g., from another power stage circuit 10). The current feedback control circuit 37 is configured to receive the temperature sense value Tsen, the current sense value Isen and the highest temperature value Thest from the temperature sense circuit 33, the current sense circuit 35 and the temperature feedback terminal Tmon respectively, so as to output the current sense value Isen or adjusted current sense value Isen_m. The current feedback terminal Imon is configured to output the current sense value Isen or the adjusted current sense value Isen_m to an external element of the power stage circuit 10 (e.g., to the control circuit 12 in FIG. 1).

In the above embodiments, the temperature sense value Tsen and the highest temperature value Thest are all transmitted in the form of voltage signal, the temperature represented by the temperature sense value Tsen is positively correlated with the voltage value of the voltage signal, and the temperature represented by the highest temperature value Thest is also positively correlated with the voltage value of the voltage signal. Under the condition that the temperature sense value Tsen is smaller than the highest temperature value Thest (i.e., the voltage signal corresponding to the temperature sense value Tsen has a voltage value smaller than that of the voltage signal corresponding to the highest temperature value Thest), the temperature comparison circuit 371 receives the highest temperature value Thest from an external element of the power stage circuit 10 through the temperature feedback terminal Tmon continuously. Under the condition that the temperature sense value Tsen is greater than or equal to the highest temperature value Thest (i.e., the voltage signal corresponding to the temperature sense value Tsen has a voltage value greater than or equal to that of the voltage signal corresponding to the highest temperature value Thest), the temperature comparison circuit 371 outputs the temperature sense value Tsen to an external element of the power stage circuit 10 through the temperature feedback terminal Tmon. Moreover, when at least one power stage circuit 10 outputs the temperature sense value Tsen, since the temperature feedback terminals Tmon of the power stage circuits 10 are coupled to each other and are coupled to the control circuit 12 (as shown in FIG. 1), the voltage signal with the highest voltage value would be kept as the new highest temperature value Thest (i.e., replacing the previous highest temperature value Thest) to be output to each power stage circuit 10 and the control circuit 12.

Figure 4:
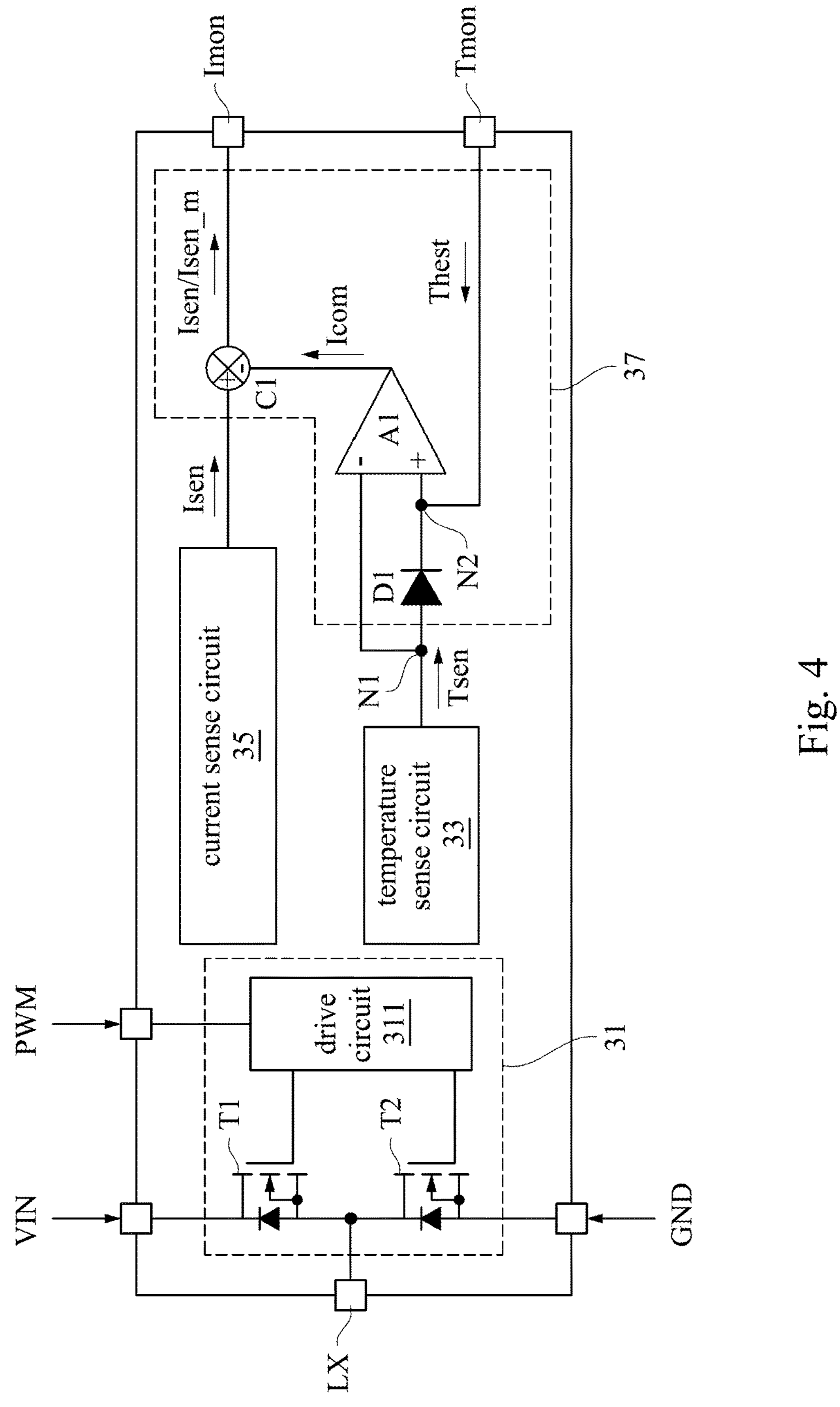
FIG. 4 is a circuit diagram of the power stage circuit in accordance with some embodiments of the present disclosure.

Referring to FIG. 4, FIG. 4 is a circuit diagram of the power stage circuit 10 in accordance with some embodiments of the present disclosure. In some embodiments, the power circuit 31 includes a high-side switch T1, a low-side switch T2 and a drive circuit 311. A first terminal of the high-side switch T1 is configured to receive the input voltage VIN, a second terminal of the high-side switch T1 and a first terminal of the low-side switch T2 are coupled at the current output terminal LX, and a second terminal of the low-side switch T2 is configured to receive the ground voltage GND. The drive circuit 311 is coupled to a control terminal of the high-side switch T1 and a control terminal of the low-side switch T2 respectively, and is configured to receive the control signal PWM and control the high-side switch T1 and the low-side switch T2 to be turned on alternatively according to the control signal PWM, so as to generate the output current IL at the current output terminal LX. For example, if the duty ratio of the control signal PWM is 60%, it means that in each period of the control signal PWM, the enabling level accounts for 60% of the cycle and the disabling level accounts for 40% of the cycle. The enabling level and the disabling level of the control signal PWM are configured to turn on the high-side switch T1 and the low-side switch T2 respectively. In particular, each of the high-side switch T1 and the low-side switch T2 can be implemented by a metal oxide semiconductor transistor.

In some embodiments, as shown in FIG. 4, the current feedback control circuit 37 includes a switch circuit D1, an amplification circuit A1 and an operational circuit C1. A first terminal of the switch circuit D1 is electrically coupled to the temperature sense circuit 33 at the first node N1, and a second terminal of the switch circuit D1 is electrically coupled to the temperature feedback terminal Tmon at the second node N2. A first input terminal (presented by a symbol "−" in FIG. 4) of the amplification circuit A1 is electrically coupled to the first node N1, and a second input terminal (presented by a symbol "+" in FIG. 4)) of the amplification circuit A1 is electrically coupled to the second node N2. The operational circuit C1 is electrically coupled to the current sense circuit 35, an output terminal of the amplification circuit A1 and the current feedback terminal Imon. In particular, the switch circuit D1 can be implemented by a diode circuit, the amplification circuit A1 can be implemented by an operational amplifier, and the operational circuit C1 can be implemented by an addition/subtraction circuit.

Furthermore, referring to FIGS. 3 and 4 together, the switch circuit D1 and the amplification circuit A1 in FIG. 4 can be used to implement the temperature comparison circuit 371 in FIG. 3, and the operational circuit C1 in FIG. 4 can be used to implement the sense value adjusting circuit 373 in FIG. 3.

Figure 5:
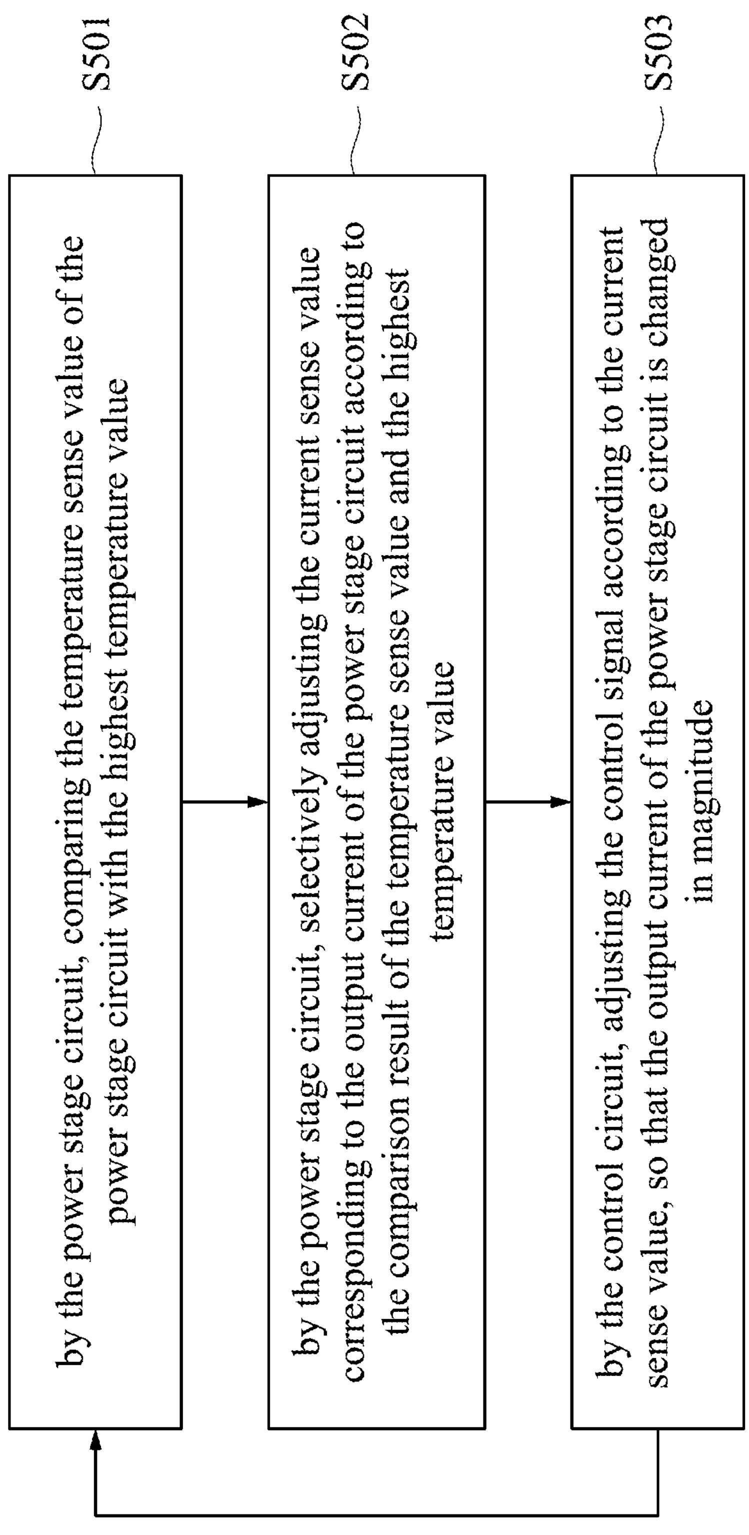
FIG. 5 is a flow diagram of a temperature balancing method in accordance with some embodiments of the present disclosure.

The operation of the power stage circuit 10 would be described in detail below with reference to a temperature balancing method 500 as shown in FIG. 5. Referring to FIG. 5, FIG. 5 is a flow diagram of the temperature balancing method 500 in accordance with some embodiments of the present disclosure. In some embodiments, as shown in FIG. 5, the temperature balancing method 500 includes steps S501-S503.

In step S501, by the power stage circuit 10, the temperature sense value Tsen of the power stage circuit 10 is compared with the highest temperature value Thest. In some embodiments, as shown in FIG. 4, the switch circuit D1 and the amplification circuit A1 both receive the temperature sense value Tsen from the temperature sense circuit 33 via the first node N1, and receive the highest temperature value Thest from the temperature feedback terminal Tmon via the second node N2, so that the amplification circuit A1 compares the temperature sense value Tsen with the highest temperature value Thest. As described in the embodiments of FIG. 3, the comparison of the temperature sense value Tsen and the highest temperature value Thest can be carried out by the comparison of the voltage value of the voltage signal corresponding to the temperature sense value Tsen and the voltage value of the voltage signal corresponding to the highest temperature value Thest.

Figure 6:
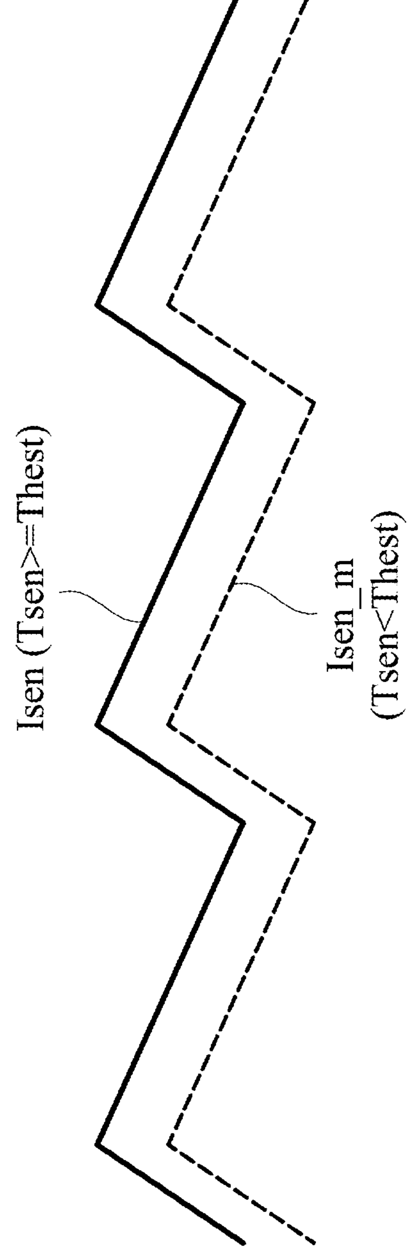
FIG. 6 is a schematic diagram of a current sense value and an adjusted current sense value in accordance with some embodiments of the present disclosure.

Afterwards in step S502, the current sense value Isen corresponding to the output current IL of the power stage circuit 10 is selectively adjusted, by the power stage circuit 10, according to the comparison result of the temperature sense value Tsen and the highest temperature value Thest. Step S502 would be described later below with reference to FIG. 6, in which FIG. 6 is a schematic diagram of the current sense value Isen and the adjusted current sense value Isen_m in accordance with some embodiments of the present disclosure.

In some embodiments, under the condition that the temperature sense value Tsen is smaller than the highest temperature value Thest, the switch circuit D1 in FIG. 4 is in a turn-off state, and thus a first voltage difference is generated between the first node N1 and the second node N2, in which the first voltage difference is a non-zero voltage difference (because the switch circuit D1 is in the turn-off state as well as the voltage value of the first node N1 is smaller than the voltage value of the second node N2). The amplification circuit A1 outputs a compensation value Icom according to the first voltage difference. For example, the amplification circuit A1 amplifies the first voltage difference to generate the compensation value Icom. The operational circuit C1 subtracts the compensation value Icom from the current sense value Isen to generate the adjusted current sense value Isen_m (as shown in FIG. 6). Moreover, the operational circuit C1 outputs the adjusted current sense value Isen_m to the current feedback terminal Imon.

In some embodiments, under the condition that the temperature sense value Tsen is greater than or is substantially equal to the highest temperature value Thest, the switch circuit D1 in FIG. 4 is in a turn-on state, and thus a second voltage difference is generated between the first node N1 and the second node N2, in which the second voltage difference is zero (because the switch circuit D1 is in the turn-on state). In other words, the first node N1 and the second node N2 are short-circuited in this condition. The amplification circuit A1 outputs the compensation value Icom being a zero value according to the second voltage difference, so that the output of the operational circuit C1 is still equal to Isen after subtracting the compensation value Icom from the current sense value Isen. Thus, it can also be understood that the operational circuit C1 directly outputs the current sense value Isen (as shown in FIG. 6).

As can be seen from the descriptions of step S501 and step S502, the current feedback control circuit 37 compares the temperature sense value Tsen with the highest temperature value Thest through the temperature comparison circuit 371 (i.e., the switch circuit D1 and the amplification circuit A1), and outputs one of the current sense value Isen and the adjusted current sense value Isen_m to the current feedback terminal Imon according to the comparison result of the temperature sense value Tsen and the highest temperature value Thest through the sense value adjusting circuit 373 (i.e., the operational circuit C1).

In step S503, by the control circuit 12, the control signal PWM is adjusted according to the current sense value (e.g., the current sense value Isen or the adjusted current sense value Isen_m in FIG. 6), so that the output current IL of the power stage circuit 10 is changed in magnitude. The descriptions of step S503 is similar to the descriptions of the current balancing operation, and therefore are omitted hereinafter. In addition, as shown in FIG. 5, after step S503, the converter circuit 100 can perform steps S501-S503 again.

The temperature balancing method 500 would then be described using some specific numerical values as example based on the structure of the converter circuit 100 in FIG. 1. In some assumptions, the current sense values Isen[1]-Isen[4] sensed by the power stage circuits 10[1]-10[4] are all 10 amp (A). Under a non-ideal condition, the temperature sense value Tsen of the power stage circuit 10[1] is 67 degrees, the temperature sense value Tsen of the power stage circuit 10[2] is 72 degrees, the temperature sense value Tsen of the power stage circuit 10[3] is 85 degrees, and the temperature sense value Tsen of the power stage circuit 10[4] is 70 degrees. As can be seen from this, the highest temperature value Thest of the power stage circuits 10[1]-10[4] is 85 degrees.

In accordance with the above descriptions, since the temperature sense value Tsen of the power stage circuit 10[3] is equal to the highest temperature value Thest, the power stage circuit 10[3] directly outputs the current sense value Isen[3] of 10 A to the control circuit 12 (corresponding to step S502). Moreover, it is assumed that the compensation value Icom is 3 A. Since the temperature sense value Tsen of the power stage circuit 10[1], the temperature sense value Tsen of the power stage circuit 10[2] and the temperature sense value Tsen of the power stage circuit 10[4] are all smaller than the highest temperature value Thest, the current sense value Isen[1], the current sense value Isen[2] and the current sense value Isen[4] are respectively adjusted from 10 A to 7 A according to the compensation value Icom by the power stage circuit 10[1], the power stage circuit 10[2] and the power stage circuit 10[4], and are output to the control circuit 12 (corresponding to step S502). In addition, this 7 A of the current sense value is the adjusted current sense value Isen_m in FIGS. 3 and 4. In addition, it should be understood that the compensation value Icom of 3 A is only an example and for convenience of descriptions. In practice, different valued Icom can be used to respectively adjust the current sense value Isen[1], the current sense value Isen[2] and the current sense value Isen[4] according to different temperature sense values Tsen of the power stage circuit 10[1], the power stage circuit 10[2] and the power stage circuit 10[4].

Afterwards, corresponding to step S503, the control circuit 12 calculates that the current average value Iavg is 7.75 A, determines that the current sense value Isen[1], the current sense value Isen[2] and the current sense value Isen[4] are all smaller than the current average value Iavg, and determines that the current sense value Isen[3] is higher than the current average value Iavg. As can be seen from the descriptions of FIGS. 2A and 2B, the control circuit 12 raises the duty ratios DR of the control signal PWM[1], the control signal PWM[2] and the control signal PWM[4], and reduces the duty ratio DR of the control signal PWM[3].

Accordingly, the current sense value Isen[1] sensed by the power stage circuit 10[1], the current sense value Isen[2] sensed by the power stage circuit 10[2] and the current sense value Isen[4] sensed by the power stage circuit 10[4] are all changed from 10 A to 11 A, and the current sense value Isen[3] sensed by the power stage circuit 10[3] is changed from 10 A to 7 A. In response to changing of the output currents IL[1]-IL[4], the temperature sense value Tsen of the power stage circuit 10[1] is changed to 70 degrees, the temperature sense value Tsen of the power stage circuit 10[2] is changed to 74 degrees, the temperature sense value Tsen of the power stage circuit 10[3] is changed to 79 degrees, and the temperature sense value Tsen of the power stage circuit 10[4] is changed to 72 degrees. As can be seen from the above, the temperature difference among the power stage circuits 10[1]-10[4] becomes smaller.

In the above descriptions, since the temperature of the power stage circuit 10[3] is still the highest, the converter circuit 100 would repeat the above operations to further reduce the temperature difference among the power stage circuits 10[1]-10[4]. Eventually, the power stage circuits 10[1]-10[4] would achieve the temperature balancing.

In the embodiments of FIG. 4, the amplification circuit A1 is preset to have a gain, and the gain is not adjusted during the operation of the power stage circuit 10. However, the present disclosure is not limited herein.

Figure 7:
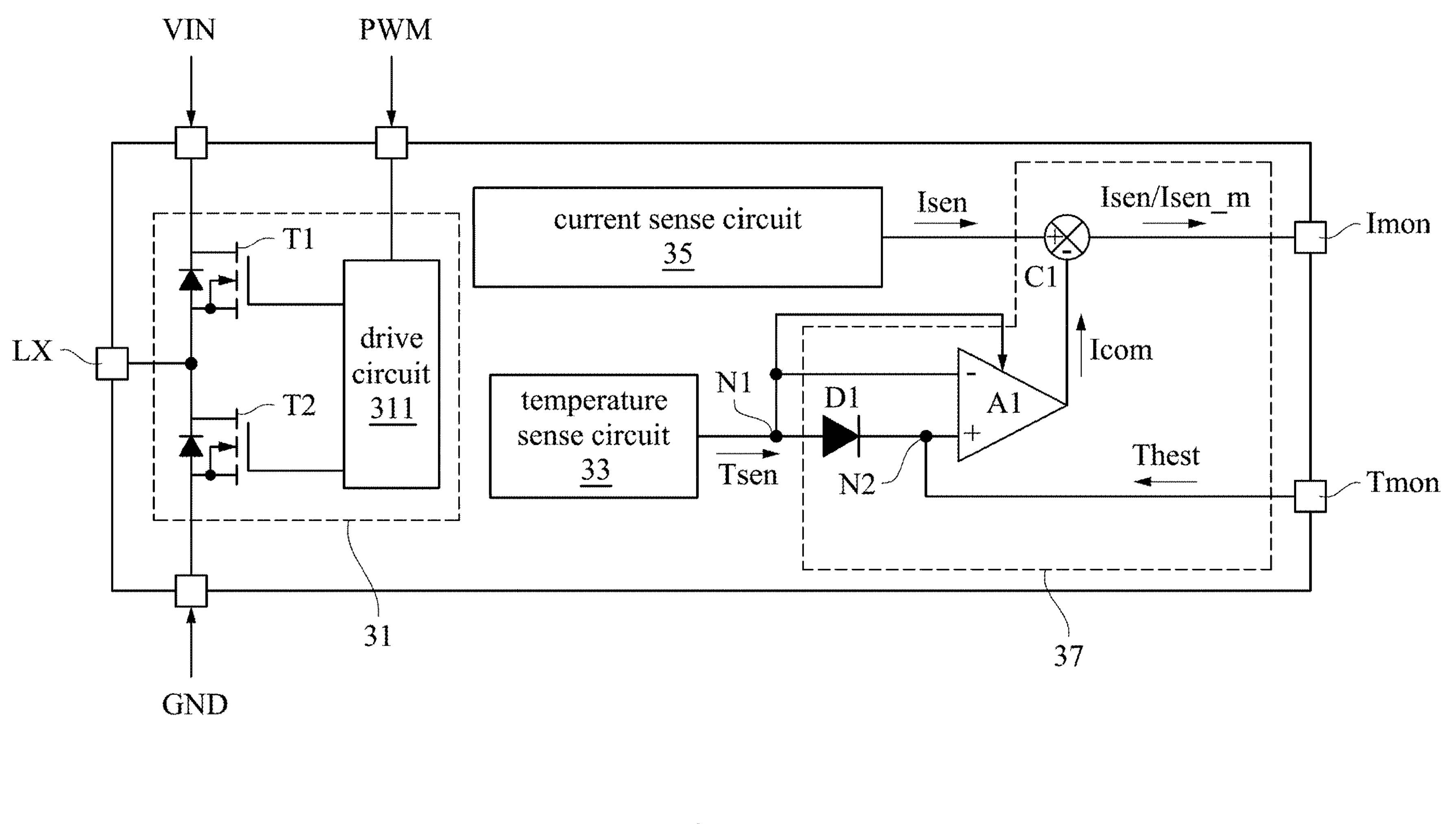
FIG. 7 is a circuit diagram of the power stage circuit in accordance with some embodiments of the present disclosure.

Referring to FIG. 7, FIG. 7 is a circuit diagram of the power stage circuit 10 in accordance with some embodiments of the present disclosure. The components or signals in FIG. 7 which are the same or similar to those in FIG. 4 are presented by same symbols, and are not further described here. In the embodiments of FIG. 7, the temperature sense value Tsen is output to the inside of the amplification circuit A1, so that the amplification circuit A1 may adjust the gain according to the temperature sense value Tsen. In some embodiments, the gain is negatively correlated with the temperature sense value Tsen. For example, the gain will be reduced as the temperature sense value Tsen raises, and will be raised as the temperature sense value Tsen reduces. In general, the greater the temperature sense value Tsen is, the closer to the highest temperature value Thest the temperature of the power stage circuit 10 will be, thus avoiding over-adjusting the current sense value Isen and/or the output current IL.

Figure 8:
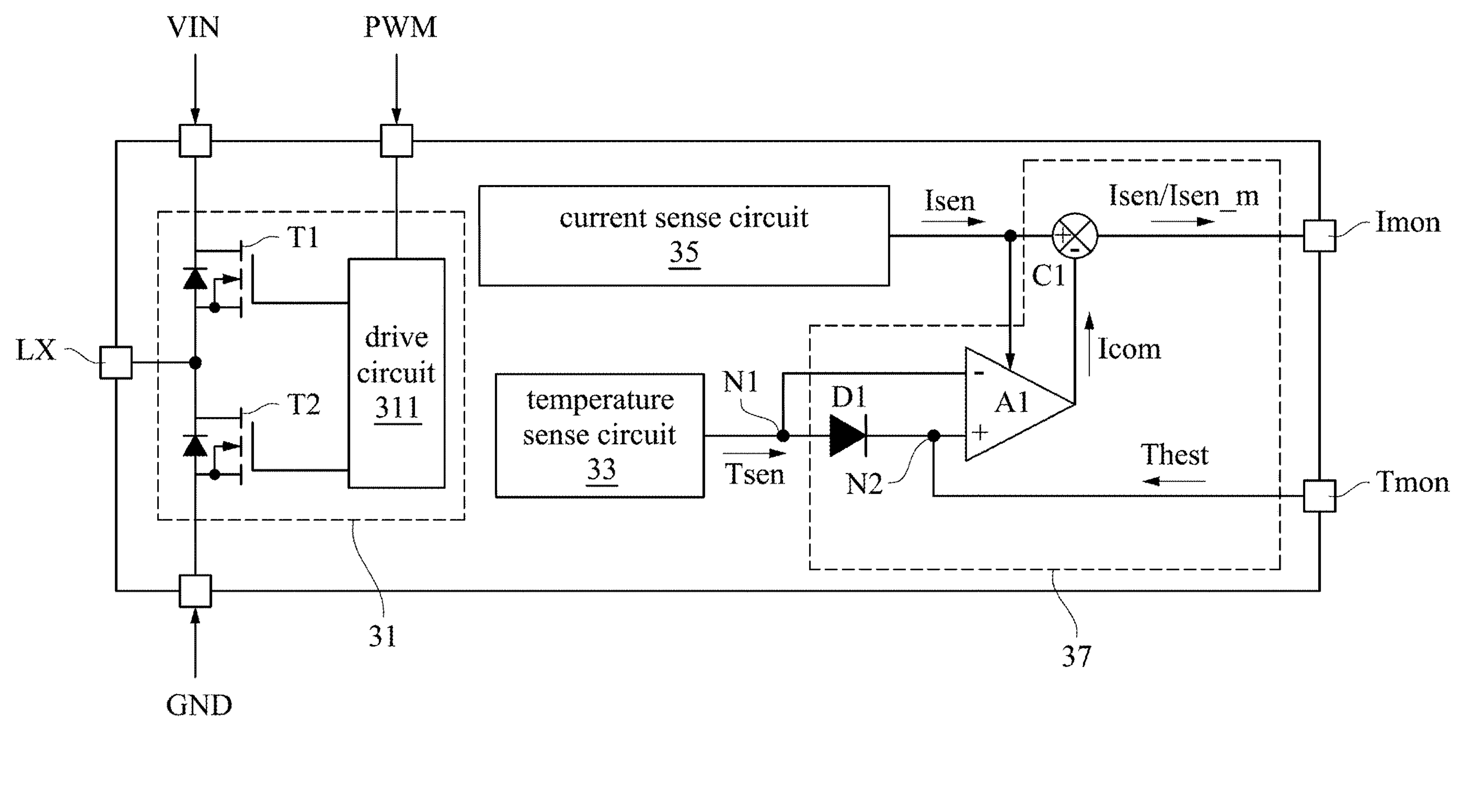
FIG. 8 is a circuit diagram of the power stage circuit in accordance with some embodiments of the present disclosure.

Referring to FIG. 8, FIG. 8 is a circuit diagram of the power stage circuit 10 in accordance with some embodiments of the present disclosure. The components or signals in FIG. 8 which are the same or similar to those in FIG. 4 are presented by same symbols, and are not described again here. In the embodiments of FIG. 8, the current sense value Isen is output to the inside of the amplification circuit A1, so that the amplification circuit A1 may adjust the gain according to the current sense value Isen. In some embodiments, the gain is negatively correlated with the current sense value Isen. For example, the gain would be reduced as the current sense value Isen rises, and would be risen as the current sense value Isen reduces. In general, the greater the current sense value Isen is, the closer to the highest temperature value Thest the temperature of the power stage circuit 10 will be, thus avoiding over-adjusting the current sense value Isen and/or the output current IL.

As can be seen from the above embodiments of the present disclosure, the power stage circuit 10 selectively adjusts the current sens value Isen according to the comparison result of the temperature sense value Tsen and the highest temperature value Thest, and the converter circuit 100 of the present disclosure can thereby automatically control the power stage circuits 10 to achieve the temperature balancing without the need for manually adjusting the current sense value Isen.

As used herein, the term "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A converter circuit, comprising:

a plurality of power stage circuits, configured to output a plurality of output currents according to a plurality of control signals, and configured to selectively adjust a plurality of current sense values corresponding to the plurality of output currents according to a comparison result of a plurality of temperature sense values of the plurality of power stage circuits and a highest temperature value of the plurality of power stage circuits; and a control circuit, electrically coupled to the plurality of power stage circuits, wherein the control circuit is configured to output the plurality of control signals to the plurality of power stage circuits, configured to receive the plurality of current sense values from the plurality of power stage circuits, and configured to adjust the plurality of control signals according to the plurality of current sense values, so that the plurality of output currents are changed in magnitude, wherein each of the plurality of power stage circuits comprises:

a current sense circuit, configured to sense a corresponding one of the plurality of output currents, to output a corresponding one of the plurality of current sense values; and a current feedback control circuit, directly connected to the current sense circuit and configured to receive the corresponding one of the plurality of current sense values, wherein the current feedback control circuit is configured to compare a corresponding one of the plurality of temperature sense values with the highest temperature value, and configured to, in response to the corresponding one of the plurality of temperature sense values smaller than the highest temperature value, reduce the corresponding one of the plurality of current sense values output directly from the current sense circuit and output the reduced corresponding one of the plurality of current sense values to the control circuit, and further configured to, in response to the corresponding one of the plurality of temperature sense values equal to the highest temperature value, not reduce the corresponding one of the plurality of current sense values output directly from the current sense circuit and output the unreduced corresponding one of the plurality of current sense values to the control circuit.

2. The converter circuit of claim 1, wherein each of the plurality of power stage circuits further comprises:

a power circuit, configured to output the corresponding one of the plurality of output currents according to a corresponding one of the plurality of control signals;

a temperature sense circuit, configured to sense a temperature of a corresponding one of the plurality of power stage circuits, to output the corresponding one of the plurality of temperature sense values;

a temperature feedback terminal; and a current feedback terminal;

wherein the current feedback control circuit is further connected to the temperature sense circuit, the temperature feedback terminal and the current feedback terminal.

3. The converter circuit of claim 2, wherein the current feedback control circuit comprises:

a temperature comparison circuit, electrically coupled to the temperature sense circuit and the temperature feedback terminal at a first node and a second node respectively, and configured to compare the corresponding one of the plurality of temperature sense values with the highest temperature value; and a sense value adjusting circuit, electrically coupled to the current sense circuit, the temperature comparison circuit and the current feedback terminal, and configured to output the corresponding one of the plurality of current sense values or the adjusted corresponding one of the plurality of current sense values to the current feedback terminal.

4. The converter circuit of claim 3, wherein under a condition that the corresponding one of the plurality of temperature sense values is smaller than the highest temperature value, the temperature comparison circuit outputs a compensation value according to a voltage difference generated between the first node and the second node, and the sense value adjusting circuit reduces the corresponding one of the plurality of current sense values by the compensation value and outputs the reduced corresponding one of the plurality of current sense values.

5. The converter circuit of claim 3, wherein under a condition that the corresponding one of the plurality of temperature sense values is equal to the highest temperature value, the temperature comparison circuit outputs a compensation value being a zero value according to a voltage difference generated between the first node and the second node, and the sense value adjusting circuit directly outputs the corresponding one of the plurality of current sense values.

6. The converter circuit of claim 1, wherein the plurality of control signals are a plurality of pulse width modulation signals, and the control circuit is configured to adjust a plurality of duty ratios of the plurality of pulse width modulation signals according to the plurality of current sense values.

7. The converter circuit of claim 6, wherein the control circuit is configured to average the plurality of current sense values of the plurality of power stage circuits to obtain a current average value, and is configured to compare the plurality of current sense values of the plurality of power stage circuits with the current average value.

8. The converter circuit of claim 7, wherein the control circuit is configured to raise the duty ratio of a corresponding one of the plurality of pulse width modulation signals when the corresponding one of the plurality of current sense values is smaller than the current average value, and is configured to reduce the duty ratio of the corresponding one of the plurality of pulse width modulation signals when the corresponding one of the plurality of current sense values is greater than the current average value.

9. A temperature balancing method, applicable to a converter circuit, wherein the converter circuit comprises a plurality of power stage circuits and a control circuit, the plurality of power stage circuits are configured to output a plurality of output currents according to a plurality of control signals output by the control circuit, each of the plurality of power stage circuits comprises a current sense circuit and a current feedback control circuit directly connected to the current sense circuit, and the temperature balancing method comprises:

sensing, by the current sense circuit, a corresponding one of the plurality of output currents, to output a corresponding one of a plurality of current sense values;

receiving, by the current feedback control circuit, the corresponding one of the plurality of current sense values;

comparing, by the current feedback control circuit, a corresponding one of a plurality of temperature sense values of the plurality of power stage circuits with a highest temperature value of the plurality of power stage circuits;

in response to the corresponding one of the plurality of temperature sense values smaller than the highest temperature value, by the current feedback control circuit, reducing the corresponding one of the plurality of current sense values output directly from the current sense circuit and outputting the reduced corresponding one of the plurality of current sense values to the control circuit;

in response to the corresponding one of the plurality of temperature sense values equal to the highest temperature value, by the current feedback control circuit, not reducing the corresponding one of the plurality of current sense values output directly from the current sense circuit and outputting the unreduced corresponding one of the plurality of current sense values to the control circuit; and adjusting, by the control circuit, the plurality of control signals according to the plurality of current sense values, so that the plurality of output currents are changed in magnitude.

* * * * *